United States Patent [19]

Gardner et al.

[11] Patent Number: 4,678,159

[45] Date of Patent: Jul. 7, 1987

[54] MANUALLY ACTUATED FLUID FLOW CONTROL VALVE AND METHOD OF MAKING SAME

[75] Inventors: John F. Gardner, Loveland; Gerald H. Morton, Cincinnati, both of Ohio

[73] Assignee: Xomox Corporation, Cincinnati, Ohio

[21] Appl. No.: 733,964

[22] Filed: May 14, 1985

[51] Int. Cl.$^4$ .............................................. F16K 35/02
[52] U.S. Cl. ..................................... 251/107; 251/101; 251/109; 251/144
[58] Field of Search ............... 137/1; 251/95, 99, 101, 251/102, 107, 108, 109, 144

[56] References Cited

U.S. PATENT DOCUMENTS

| | | | |
|---|---|---|---|
| 1,004,388 | 9/1911 | Dickert | 251/109 |
| 1,323,661 | 12/1919 | Urton | 251/109 |
| 2,127,225 | 8/1938 | Jensen | 251/109 |
| 2,208,850 | 7/1940 | Mayer | 251/109 |
| 4,016,907 | 4/1977 | Rawstron | 251/144 |
| 4,018,292 | 4/1977 | Roll et al. | 251/109 |
| 4,394,002 | 7/1983 | Polley | 251/144 |

*Primary Examiner*—Gerald A. Michalsky
*Attorney, Agent, or Firm*—Kinney & Schenk

[57] ABSTRACT

A manually actuated fluid flow control valve assembly and method of making same are provided wherein the valve assembly has an associated support structure and has a manually operated handle operatively connected to a closure device for the valve assembly and the handle is manually movable between an open and closed position thereof which define corresponding open and closed positions of the closure device and wherein the valve assembly has a manually releasable means which includes automatic lock means for automatically locking the handle once the handle and its closure device are in a closed position. In accordance with another embodiment of this invention an improved manually operated handle is provided for such valve assembly, and such handle has a weakened portion which assures easy shearing thereof under certain conditions.

18 Claims, 14 Drawing Figures

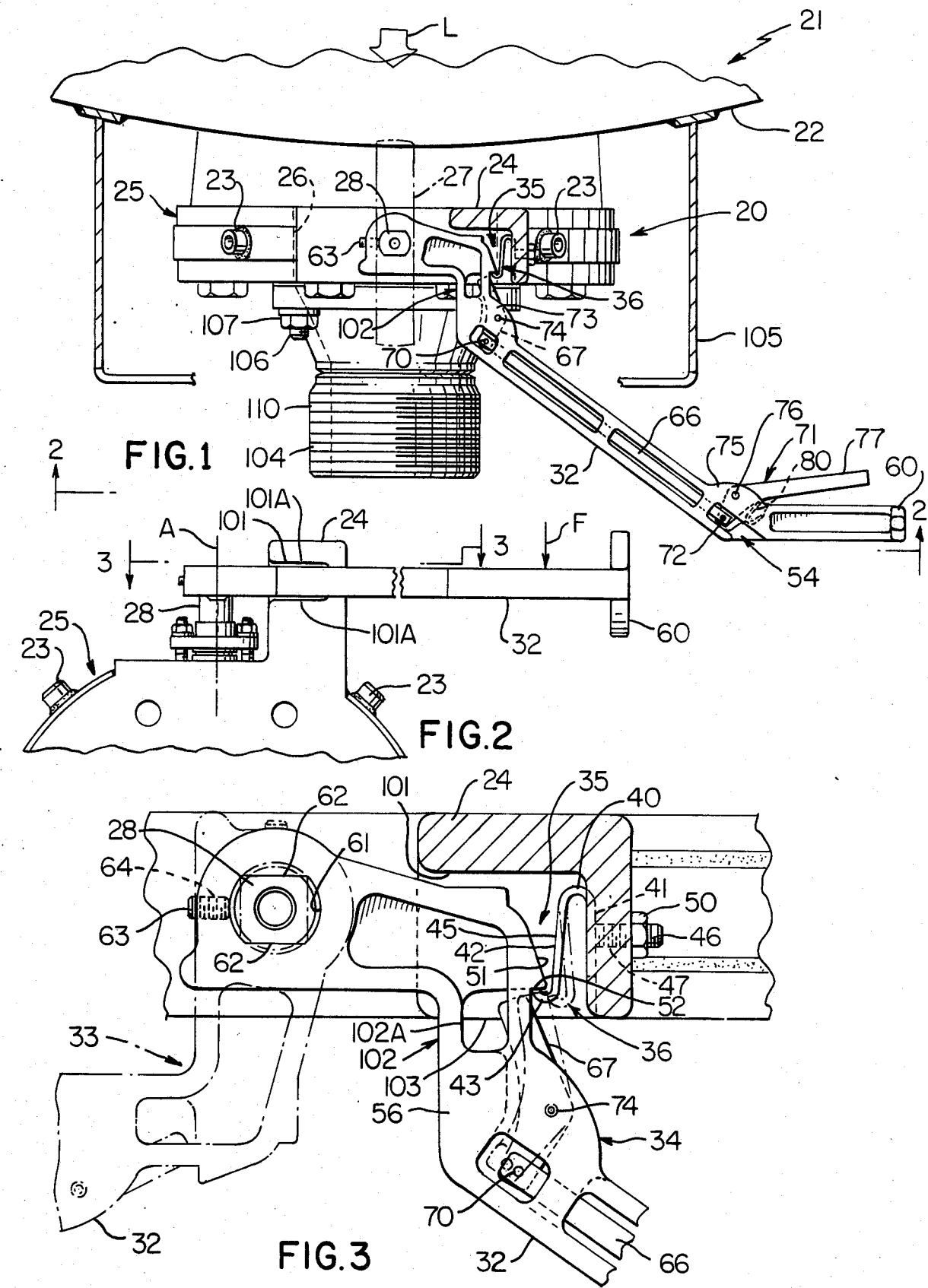

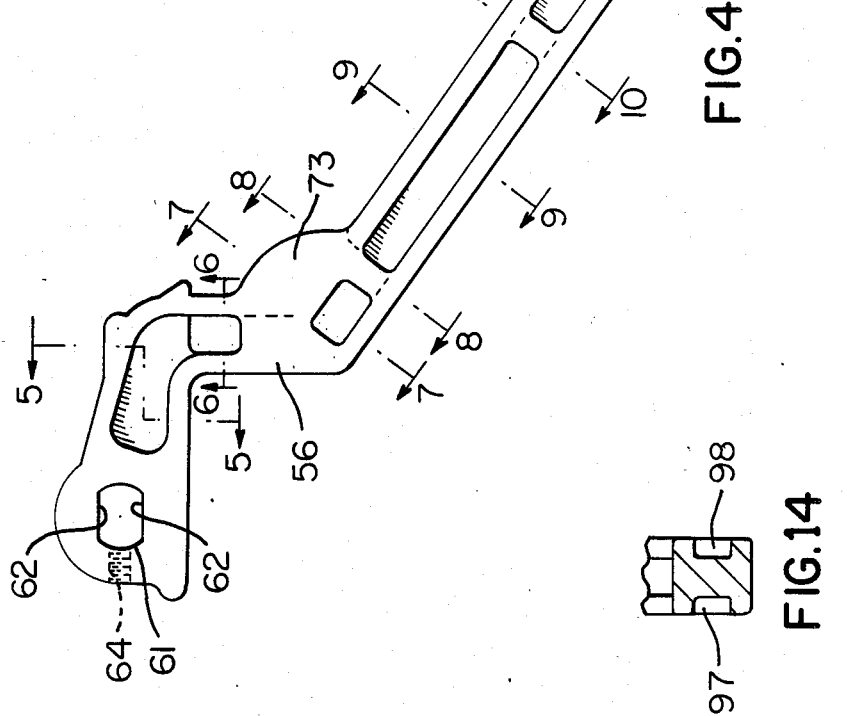

MANUALLY ACTUATED FLUID FLOW CONTROL VALVE AND METHOD OF MAKING SAME

BACKGROUND OF THE INVENTION

1. Field of the Invention

This invention relates to a manually actuated fluid flow control valve assembly which is particularly adapted to be used on a railway tak car as a bottom operable lading valve and which has manually releasable means including automatic lock means for holding the valve and an associated manually operated actuating handle for the valve assembly in a closed position.

2. Description of Prior Art

It is well known in the art to provide a valve assembly which is particularly adapted for use on a railway tank car and which is operable from the bottom of such tank car.

It is also known to provide bottom operable butterfly valves for railway tank cars and examples of such butterfly valves are disclosed in U.S. Pat. Nos. 4,016,907 and 4,394,002.

It is also known to provide a manually actuated fluid flow control valve assembly which has an associated support structure and with the valve assembly comprising a valve body having a flow passage therethrough, a closure device carried by the valve body for controlling fluid flow through the passage, a manually operated handle operatively connected to the closure device, with the handle being manually movable between an open and a closed position thereof which define a corresponding open and closed position of the closure device and hence the valve assembly, and manually releasable means for holding such handle in its closed position. An example of such a valve and handle are shown in U.S. Pat. No. 4,397,444.

However, the Association of American Ralroads (AAR) and the Department of Transportation (DOT) have railway tank car regulations which require that projections extending in excess of 1 inch below the bottom of the tank of such a car must be protected by a skid, or if such a projection is part of a valve assembly associated with the tank car it must be capable of being sheared away without affecting the integrity of such valve assembly. In instances where a skid is provided this skid must be in the form of a ramp having a longitudinal dimension along the bottom of the tank which is three times the dimension projecting downwardly from such bottom.

In providing a valve assembly for a tank car, such as a railway tank car, it is important to provide a valve assembly which will not tend to open during normal usage thereof. Further, to assure that each valve assembly will not tend to open, locking means is provided to lock the valve assembly in its closed position to prevent inadvertent opening thereof at any time and in particular to prevent such opening in the event of an accident involving the valve assembly.

Nevertheless, valve assemblies proposed heretofore are deficient because they either do not employ means which provide a positive locking action or such valve assemblies and their associated locking devices and actuating handles are too complex and expensive.

SUMMARY OF THE INVENTION

This invention provides an improved valve assembly which overcomes the above-mentioned deficiencies.

In accordance with one feature of this invention an improved manually actuated fluid flow control valve assembly is provided which has an associated support structure and the valve assembly comprises a valve body having a flow passage therethrough, a closure device carried by the valve body for controlling fluid flow through the passage, a manually operated handle operatively connected to the closure device with the handle being manually movable between an open and a closed position thereof which also define an open and a closed position of the closure device and hence the valve assembly, and manually releasable means for holding the handle in the closed position.

In accordance with one embodiment of the improved valve assembly of this invention the manually releasable means comprises automatic lock means carried by one of the said structure and said handle for engaging the other of said structure and said handle for providing automatic locking of the handle once the handle and the closure device are in the closed position of the handle, closure device, and valve assembly.

In accordance with another feature of this invention an improved manually operated handle is provided for actuating a fluid flow control valve assembly which has an assoicated support structure, a valve body having a flow passage therethrough, a closure device carried by said valve body for controlling fluid flow through said passage, means connecting said handle to said closure device, said handle being manually movable between an open and a closed position thereof which also define an open and a closed position of said closure device and hence said valve assembly, and manually releasable means for holding said handle in said closed position.

In accordance with another embodiment of this invention the handle comprises linkage means for operating said manually releasable means and manually releasing said handle from said closed position to allow said handle to be moved away therefrom toward said open position.

Accordingly, it is an object of this invention to provide an improved valve assembly of the character mentioned.

Another object of this invention is to provide an improved handle of the character mentioned for actuating a valve assembly.

Another object of this invention is to provide an improved method of making a valve assembly of the character mentioned.

Other features, objects, uses, and advantages of this invention are apparent from a reading of this description which proceeds with reference to the accompanyng drawings forming a part thereof.

BRIEF DESCRIPTION OF THE DRAWINGS

The accompanying drawings show present preferred embodiments of this invention, in which:

FIG. 1 is a view with parts in cross section, parts in elevation, and parts broken away illustrating one exemplary embodiment of a valve assembly of this invention mounted at the bottom of an associated tank car which is shown and described in this example as a railway tank car;

FIG. 2 is a view with the central portion thereof broken away taken essentially on the line 2—2 of FIG. 1;

FIG. 3 is an enlarged view with parts in cross section, parts in elevation, and parts broken away taken essentially on the line 3—3 of FIG. 2;

FIG. 4 is a view of the handle for the valve assembly of FIG. 1 minus its associated linkage means; and FIGS. 5, 6, 7, 8, 9, 10, 11, 12, 13, and 14 are cross-sectional views taken essentially on the lines 5—5, 6—6, 7—7, 8—8, 9—9, 10—10, 11—11, 12—12, 13—13, and 14—14 respectively of FIG. 4.

DETAILED DESCRIPTION

The valve assembly of this invention is a manually actuated fluid flow control valve assembly in the form of a butterfly valve assembly which is designated generally by the reference numeral 20. The valve assembly 20 is shown in FIG. 1 of the drawings being used as a lading valve for a fluid-containing tank which is designated generally by the reference numeral 21 of a railway tank car 22; and, the tank 21 is particularly adapted to contain a fluid for transportation, usage, and/or storage. The contained fluid may be any suitable fluid and generally is in the form of a liquid, usually under positive pressure, and such liquid is shown schematically by an arrow which is designated by the reference letter "L".

The exemplary manually actuated fluid flow control valve assembly 20 is of the type which is particularly adapted to have a heat transfer fluid (not shown) circulated therethrough for heating of such valve to facilitate the flow of liquid L through such valve and as is known in the art. The valve assembly 20 has suitable ports, including ports 23 which enable flow of such heat transfer fluid therethrough.

The valve assembly 20 has an associated support structure 24 which will be described in more detail subsequently; and, such assembly comprises a valve body 25 having a fluid flow passage 26 therethrough which is of circular cross-sectional outline. A closure device 27 is carried by the valve body 25 for controlling fluid flow through the passage 26. The closure device 27 is in the form of a closure disc 27 which is also of circular outline corresponding to passage 26; and, inasmuch as the valve body 25, flow passage 26, and closure disc 27 are of conventional construction, these components will not be described in further detail herein.

The disc 27 has shaft means 28 which is provided for supporting and rotating same and as is common on butterfly valves. The disc 27 also has a sealing surface about its outer periphery which is adapted to engage an associated sealing surface provided on the valve body 25 to close and thereby seal the valve assembly 20 and prevent fluid flow therethrough. The shaft means 28 is used to provide partial rotation or pivotal movement of the disc 27 within the passage 26 to open and close the valve.

The shaft means 28 of this example preferably includes a pair of shaft stems extending from opposite ends of the disc 27 and each stem is also designated by the reference numeral 28. The stems are disposed about a common axis so that the disc is eccentric or offset in two mutually perpendicular directions with respect to such common axis in a manner which is well known in the art of butterfly valves for purposes which are also well known and thus will not be described further herein. The two eccentricities serve to provide a cam-like action to the movement of the disc 27 as it is pivoted between fully open and fully closed positions whereby the disc 27 is not subjected to a constant scrubbing of the valve sealing surfaces and thereby is free of excessive disc drag and sealing surface deformation and for well known reasons.

The valve assembly 20 has a manually operated handle which is designated generally by the reference numeral 32; and, the handle 32 is manually movable between an open position thereof, the inner part of which is shown by dotted lines at 33 in FIG. 3, and a closed position shown by solid lines at 34. The positions of the handle at 33 and 34 also define a corresponding open and closed position of the closure device or disc 27 and hence the valve assembly 20.

The valve assembly 20 has manually releasable means, which is designated generally by the reference numeral 35, for holding the handle 32 in the closed position illustrated at 34 and the manually releasable means comprises automatic lock means 36 carried by one of the support structure 24 and handle 32 for engaging the other of the support structure 24 and handle 32 for providing automatic locking of the handle 32 once such handle and the closure device or disc 27 are in the closed position. The automatic lock means 36 in this example of the invention is shown as being carried or supported by the support structure 24, as will now be described in more detail. However, it will be appreciated that such automatic lock means 36 could be carried or supported by the handle 32 in some applications of this invention, if desired.

The exemplary automatic lock means 36 comprises spring lock means in the form of a yieldable spring clip, which is also designated by the reference numeral 36, and such spring clip has a substantially U-shaped configuration defined by a bight 40 having a pair of legs 41 and 42 diverging therefrom with the leg 41 being fastened to the structure 24 and the other leg 42 having a projection 43 which extends or is turned away from both of the legs 41 and 42. In this example of the invention the projection 43 is adapted to yieldingly engage the handle 32 and provide automatic locking thereof. The projection 43 of this example has an arcuate configuration which is a substantially semi-circular configuration and which hooks toward the outside surface 45 of the leg 42.

As will be readily apparent from FIG. 3 of the drawings, the leg 41 is fastened to the structure 24; and, in this example of the invention a threaded stud 46 is suitably fastened to the leg 41, as by welding or the like, and the stud 46 extends through an opening 47 in the support 24. A cooperating nut 50 is threaded over the outer end of the threaded stud 46 thereby clamping the leg 41 against an associated surface of the support structure 24 once the threaded nut 50 is threaded in position.

The handle 32 has a cam surface 51 terminating in an adjoining shoulder 52 at the outer end of surface 51. The cam surface 51 is adapted to engage and be slid along the terminal end of the projection 43 to yieldingly and increasingly compress the leg 42 toward the leg 41 as the handle 32 is moved toward its closed position, illustrated at 34, whereat the projection 43 moves past the outer end of the cam surface 51 and whereupon the spring action of the leg 42 causes same to snap away from the leg 41 and thereby simultaneously provide the automatic locking of the handle 32 due to the projection 43 and in particular the terminal end of such projection, engaging the shoulder 52. This action is, in essence, a snaplocking action produced by the automatic spring lock means or spring clip 36.

The handle 32 comprises linkage means or a linkage assembly which is designated generally by the reference numeral 54 for operating the manually releasable means 35 of this example. The linkage means 54 is adapted to operatively engage the automatic spring lock means or spring clip 36 to unlock the same and allow the handle 32 to be moved away from the closed position illustrated at 34. In particular, the linkage means 54 is adapted to operatively engage the terminal end of the projection 43 of spring clip 36 to thereby move such projection out of engagement with the shoulder 52 and unlock same and thereby allow the handle 32 to be moved away from the closed position at 34 to the open position illustrated at 33 in FIG. 3.

Reference is now made to FIGS. 4–14 of the drawings which illustrate the main body of the handle minus the linkage means 54 and such main body is designated generally by the reference numeral 53. The main body 53 of handle 32 comprises a rectilinear main central portion 55 adjoined at one end, which is the inner end thereof, by a roughly L-shaped portion 56 and adjoined at its other or outer end by an extension portion or extension 57 which is disposed at an angle to the main portion 56. The extension 57 has a transverse bar 60 defining its terminal outer end whereby the bar 60 defines a T-shaped terminal end for the extension 57.

The main body 53 including its transverse bar 60 is preferably made as a single-piece casting of metal or other suitable material and has protecting means for protecting the linkage means 54; and, such protecting means will be described in more detail subsequently.

The L-shaped portion 56 has an opening 61 therein (FIG. 4) provided with opposed flats 62 which are adapted to engage corresponding flats on the shaft means extending from one of the shaft portions 28 of closure disc 27. Once the handle 32 is installed in position with a shaft portion 28 extended through opening 61, a threaded set screw 63 (FIG. 3) is threaded through a corresponding threaded opening 64 in the L-shaped portion 56 and against such shaft portion to hold the L-shaped portion 56 and hence the handle 32 firmly attached to shaft portion 28.

In this example of the invention, the manually releasable means 35 for holding the handle 32 in its closed position is carried by the structure 24 and the linkage assembly 54 is carried by the handle 32. However, it will be appreciated that the means 35 could also be carried by the handle 32. The linkage assembly 54 is adapted to operatively engage the projection 43 of the spring clip 36 to thereby move such projection out of engagement with the should 52 and unlock same to thereby allow the handle 32 to be moved away from the closed position toward its open position, as previously described. The linkage assembly 54 comprises a plurality of links pivotally supported on the handle 32 and more specifically on the main body 53 of such handle as will now be described.

In particular, the above-mentioned plurality of links comprises an elongate rectilinear link 66 (FIGS. 1 and 3) which is disposed within a central part of the main central portion 55 of body 53 of handle 32, a link 67 pivotally connected by a pivot pin 70 to one end of the link 66, and a link 71 pivotally connected by a pivot pin 72 to the opposite or outer end of the link 66. The link 67 is pivotally connected by a pivot pin 74 to an enlargement 73 extending between the inner end of the main central portion 55 of body 53 and the L-shaped portion 56 of such body. It will also be seen that the body 53 has enlargement 75 provided between the outer end of the main central portion 55 and the inner end of extension portion 57 of the handle 32. Another pivot pin 76 is provided and extends through the enlargement 75 and is utilized to pivotally fasten the link 71 to the enlargement 75.

The link 71 has an extension portion 77 which extends along the extension portion 57 of the handle 32. Thus, with the link 71 pivoted about its pin 76 the extension portion 77, in essence, serves as a hand-graspable squeezable trigger mechanism for actuating the overall linkage assembly 54.

The handle 32 also has another substantially U-shaped spring clip 80 (FIG. 1) which is suitably fastened in position between the extension portion 57 of the handle body 53 and the link 71. The spring clip 80 engages link 71 and yieldingly urges the outer end 77 of such link 71 about its pivot pin 76 thereby moving the entre linkage assembly 54 to the solid line position thereof illustrated in FIGS. 1 and 3 of the drawings. When it is desired to actuate the linkage assembly 54 to unlock the automatic lock means 36, the extension 77 of link 71 is preferably squezzed utilizing one hand thereby compressing the spring clip 80 and overriding the action thereof. This action results in a pivoting of the link 71 about its pivot pin 76 which causes movement of the link 66 toward the spring clip 36 due to the action of pivot pins 70 and 72 whereby link 67 is pivoted so that the outer end thereof is moved clockwise about its pivot pin 74, as illustrated in FIG. 3.

The pivoting of link 73 about pin 74 causes the terminal outer end of such link 73 to engage the terminal end of the projection 43 of the spring clip 36. Further pivoting of link 73 results in the projection 43 being moved out of engagement with the shoulder 52 to thereby allow the handle 32 to be unlocked and rotated clockwise toward the dotted line position illustrated at 33 in FIG. 3. In this manner, the spring clip or automatic lock means 36 is unlocked by the linkage assembly 54. As indicated above, the pivoting action of the link 67 from its solid line position to the dotted line position is produced by squeezing the outer end portion 77 of the link 71 toward extension 57 of the handle 32 in a trigger-like manner.

In using the handle 32 to open the valve 20 the outer portion 77 of link 71 is squeezed in a trigger-like manner toward extension 57. Simultaneously, the transverse bar 60 is grasped and used to help rotate the shaft 28 and hence the closure disc 27 of valve assembly 20 to its open position.

As mentioned above, the handle 32 has protecting means for protecting the linkage means 54 and such protecting means comprises a plurality of cooperating cutouts, openings, and recesses in the main body 53 of the handle and as seen in FIGS. 5 through 14. The cutouts, openings, and recesses serve to reduce the weight of the main body 53 and hence handle 32 yet do not reduce or diminish the overall strength of the main body 53. In addition, it will be appreciated that the cooperating cutouts, openings and recesses serve to isolate the linkage means 54 within parts of the main body 53 to provide protection therefor.

The main body 53 of handle 32 may be made using any suitable manufacturing technique and such body is preferably made in the form of a casting of metal or other suitable high strength material. The above-mentioned cutouts, openings, and recesses include recesses on opposite sides of the inner part of the main portion 55 of handle body 53 and as shown at 83 and 84 in FIG. 9 and similar recesses in the outer part of such main portion with only one of such recesses, also designated 83, being shown in FIG. 4.

The main portion 55 also has aligned openings as shown at 86, 87, 88, 90, and 91 as shown in FIGS. 7, 8, 10, 11, and 12 respectively for receiving the link 66 therethrough. The surfaces defining such openings 86, 87, 88, 90, and 91 serve as guide surfaces for the link 66 during substantially rectilinear movement thereof as linkage assembly 54 is operated. The openings 86 and 91 are particularly useful in assuring that the pivot pins 70 and 72 can be reached in an unobstructed manner for servicing of the linkage assembly 54.

The main body 53 also has a cutout 92 (FIGS. 7 and 8) provided in the enlargement 73 of the inner end portion of the handle body 53. A similar cutout 93 (FIGS. 11 and 12) is provided in the outer end portion of the handle body 53 in the enlargement 75. It will also be seen that L-shaped recesses 95 and 96 (FIG. 5) are provided at opposite sides of the L-shaped portion 56 of the handle body 53. Similarly, recesses 97 and 98 (FIG. 14) are provided in the extension portion 57 together with a cutout 99 (FIG. 13).

In this example of the invention it will be seen that the support structure 24 is provided as an integral part of the valve body 25. However, it will be appreciated that the support structure 24 need not necessarily be provided as a part of the valve body but may be fixed to the tank 22 or associated structure by any suitable means known in the art.

It will also be seen that with the valve assembly 20 closed, the handle 32 is received in nested relation within an associated cutout 101 (FIG. 2) in the support structure 24. The handle 32 has weakening means 102A therein defined by a cutout or open portion 102A in the L-shaped portion 56 of the handle 32 whereby a minimum amount of material remains defining the L-shaped portion 56 as shown at 102. In the event of derailment of the railway tank car 21 such minimum amount of material at 102 is easily sheared with the handle 32 in its closed position to thereby assure that the valve assembly 20 cannot be inadvertently opened and even during the shearing action the valve assembly is kept closed.

It will be appreciated that with the valve assembly 20 being a butterfly valve assembly, the closure device or disc 27 is rotatable about an axis A (FIG. 2) to provide opening and closing thereof and hence of the valve assembly 20. In addition, the cutout 101 in the support structure 24 which receives the handle 32 nested therewithin has a pair of opposed side surfaces 101A which support opposite sides of the handle; and, the support structure 24 has a surface 103 (FIG. 3) which defines a shear plane which is also designated 103.

The weakening means 102A is provided in the handle 32 to assure that with such handle in its closed position such weakening means is adjacent the shear plane 103 whereby in the event shearing forces are applied against the outer end portion of the handle in a direction essentially parallel to the axis of rotation A, with the handle 32 in its closed position, shearing of such handle will occur adjacent the weakening means substantially coplanar with the shear plane 103. The shearing forces are indicated by the letter F in FIG. 2 of this example and are shown being applied in the direction shown although they could be applied in the opposite direction. It will be appreciated that during the shearing of the handle it is confined between and by the surfaces 101A.

The valve assembly 20 also has an adapter 104 which extends beneath a ramp-like assembly 105 which is fixed to the tank 22 in accordance with the AAR specifications previously mentioned. The adapter 104 is held in position by threaded studs 106, which extend into the valve body 25, and associated threaded nuts 107. The adapter 104 has an externally threaded portion 110 for connecting an associated conduit or pipe (not shown) thereto.

As is known in the art, the studs 106 are designed such that the adapter 104 may be readily sheared away from the remainder of the valve body structure 25 without damage thereto. As previously mentioned the actuating handle is also constructed so that it may be readily sheared away as is known in the art.

In this disclosure of the invention the valve assembly is shown as a butterfly valve assembly which has a rotatable or pivotal closure disc 27 associated therewith. However, it will be appreciated that any suitable valve assembly known in the art may be utilized in accordance with the teaching of this invention.

In this disclosure of the invention use has been made of terms such as inner, outer, clockwise, and the like. However, it is to be understood that these terms are used to describe various components and the operations thereof as illustrated in the drawings and such terms are not to be considered limiting in any way.

While present exemplary embodiments of this invention and methods of practicing the same have been illustrated and described. it will be recognized that this invention may be otherwise variously embodied and practiced within the scope of the following claims.

What is claimed is:

1. In a manually actuated fluid flow control valve assembly which has an associated support structure, said valve assembly comprising, a valve body having a flow passage therethrough, a closure device carried by said valve body for controlling fluid flow through said passage, a manually operated handle operatively connected to said closure device, said handle being manually movable between an open and a closed position thereof which also define an open and a closed position of said closure device and hence said valve assembly, and manually releasable means for holding said handle in said closed position, said manually releasable means comprising automatic lock means carried by one of said structure and said handle for engaging the other of said structure and said handle for providing automatic locking of said handle once said handle and said closure device are in said closed position, said automatic lock means comprising spring lock means, the improvement in which said spring lock means is in the form of a yieldable spring clip having a substantially U-shaped configuration defined by a bight having a pair of legs diverging therefrom, one of said legs being fastened to said one of said structure and said handle and the other of said legs having a projection which extends away from both of said legs, and said projection being adapted to yieldingly engage said other of said structure and said handle and provide said automatic locking of said handle.

2. A valve assembly as set forth in claim 1 in which said projection has an arcuate configuration which hooks toward the outside surface of said other leg.

3. A valve assembly as set forth in claim 1 in which said one leg of said spring clip is fastened to said structure and said projection extends from the terminal end of said other leg and is adapted to engage said handle.

4. A valve assembly as set forth in claim 3 in which said handle has a cam surface terminating at its outer end in an adjoining shoulder which is disposed transverse thereto, said cam surface being adapted to engage and be slid along said projection to yieldingly and increasingly compress said other leg toward said one leg as said handle is moved toward said closed position where at said projection moves past said outer end of said cam surface whereupon the spring action of said other leg causes same to snap away from said one leg and thereby simultaneously provide said automatic locking of said handle due to said projection engaging said shoulder.

5. A valve assembly as set forth in claim 4 and further comprising linkage means carried by said handle and being adapted to operatively engage said projection of said spring clip to thereby move said projection out of engagement with said shoulder to unlock same and thereby allow said handle to be moved away from said closed position toward said open position.

6. A valve assembly as set forth in claim 5 in which said handle has a unitary main body which comprises a rectilinear portion, an L-shaped portion adjoining one end of said rectilinear portion, said L-shaped portion being adapted to be operatively connected to said closure device, and an extension portion adjoining the opposite end of said rectilinear portion at an angle with respect thereto, said extension portion including an outer grasping portion.

7. A valve assembly as set forth in claim 6 in which said grasping portion is in the form of a T-shaped terminal end.

8. A valve assembly as set forth in claim 6 and further comprising protecting means in said main body for protecting said linkage means while allowing free unobstructed movement thereof.

9. A valve assembly as set forth in claim 8 in which said linkage means comprises a plurality of interconnected links, said protecting means comprises a plurality of cooperating openings and cutouts in said main body, and said openings also define cooperating guide surfaces in said main body for at least one of said links.

10. A valve assembly as set forth in claim 9 in which said one link of said plurality of links is an elongate link which extends through associated openings in said rectilinear portion of said main body and further comprising, a second link pivotally connected to the inner end of said one link by a first pin and pivotally connected by a second pin to said main body between said rectilinear portion and said L-shaped portion, and a third link pivotally connected to the outer end of said one link by a third pin and pivotally connected by a fourth pin to said main body between said rectilinear portion and extension portion.

11. In a manually actuated fluid flow control valve assembly which has an associated support structure, said valve assembly comprising, a valve body having a flow passage therethough, a closure device carried by said valve body for controlling fluid flow through said passage, a manually operated handle operatively connected to said closure device, said handle being manually movable between an open and a closed position thereof which also define an open and a closed position of said closure device and hence said valve assembly, and manually releasable means for holding said handle in said closed position, said manually releasable means comprising automatic clock means carried by one of said structure and said handle for engaging the other of said structure and said handle for providing automatic locking of said handle once said handle and said closure device are in said closed position, the improvement in which said closure device is rotatable about an axis of rotation to provide said opening and closing thereof and further comprising a cutout in said support structure for receiving said handle in nested relation therewithin once said handle is in its closed position, said cutout having a pair of side surfaces with said support structure having a surface which defines a shear plane, and weakening means in said handle, said weakening means being provided in said handle to assure that with said handle in its closed position said weakening means is adjacent said shear plane whereby in the event shearing forces are applied against the outer end portion of said handle in a direction essentially parallel to said axis of rotation with said handle in its closed position shearing thereof will occur adjacent said weakening means substantially coplanar with said shear plane.

12. In a manually operated handle for actuating a fluid flow control valve assembly which has an associated support structure; a valve body having a flow passage therethrough; a closure device rotatably carried by said valve body for controlling fluid flow through said passage; means connecting said handle to said closure device to enable rotation of said closure device; said handle being manualy movable in a rotating manner between an open and a closed position thereof which also define an open and a closed position of said closure device and hence said valve assembly; manually releasable means for holding said handle in said closed position; and linkage means carried by said handle for operating said manually releasable means and manually releasing said handle from said closed position to allow said handle to be moved away therefrom toward said open position, said linkage means comprising a plurality of interconnected links carried by said handle, the improvement in which said plurality of links are disposed substantially within the confines of and have substantially the same configuration as said handle and said handle further comprises integral protecting means in said handle for protecting said plurality of links while allowing free unobstructed movement thereof, said protecting means comprising a plurality of cooperating openings and cutouts in said main body which receive said links therein and serve to isolate said links within parts of said main body, and said openings also define cooperating guide surfaces for at least one of said links.

13. In a manually operated handle for actuating a fluid flow control valve assembly which has an associated support structure; a valve body having a flow passage therethrough; a closure device carried by said valve body for controlling fluid flow through said passage; means connecting said handle to said closure device; said handle being manually movable between an open and a closed position thereof which also define an open and a closed position of said closure device and hence said valve assembly; manually releasable locking means for holding said handle in said closed position; and linkage means carried by said handle for operating said manually releasable means and manually releasing said handle from said closed position to allow said handle to be moved away therefrom toward said open position; said linkage means comprising a plurality of links carried by said handle; integral protecting means in said handle for protecting said plurality of links while allowing free unobstructed movement thereof; the improvement in which said handle further comprises a unitary main body which comprises a rectlinear portion, an L-shaped portion adjoining one end of said rectilinear portion, said L-shaped portion being adapted to be operatively connected to said closure device, and an extension portion adjoining the opposite end of said rectilinear portion at an angle with respect thereto, said extension portion including an outer grasping portion, and said manually releasable locking means engaging said L-shaped portion to hold said handle in said locked position.

14. A handle as set forth in claim in which said plurality of links comprises a plurality of interconnected links, said protecting means comprises a plurality of cooperating openings and cutouts in said main body which receive said links therein and serve to isolate said links within parts of said main body which bound said openings and cutouts, and said openings also define cooperating guide surfaces for at least one of said links.

15. A handle as set forth in claim 14 in which said one link of said plurality of links is an elongate link which extends through associated openings in said rectilinear portion of said main body and further comprising, a second link pivotally connected to the inner end of said one link by a first pin and pivotally connected by a second pin to said main body between said rectilinear portion and said L-shaped portion, and a third link pivotally connected to the outer end of said one link by a third pin and pivotally connected by a fourth pin to said main body between said rectilinear portion and extension portion.

16. A handle as set forth in claim 15 in which said outer grasping portion comprises a T-shaped terminal end.

17. In a manually operated handle for actuating a fluid flow control valve assembly which has an associated support structure; a valve body having a flow passage therethrough; a closure device carried by said valve body for controlling fluid flow through said passage; means connecting said handle to said closure device; said handle being manually movable between an open and a closed position thereof which also define an open and a closed position of said closure device and hence said valve assembly; manually releasable means for holding said handle in said closed position; and linkage means carried by said handle for operating said manually releasable means and manually releasing said handle from said closed position to allow said handle to be moved away therefrom toward said open position; the improvement in which said handle further comprises weakening means enabling shearing of the outer end portion thereof upon applying shearing forces against said outer end portion and with said handle confined in the area adjacent said weakening means.

18. In a method of making a manually actuated fluid flow control valve assembly comprising the steps of; providing a valve body which has a support structure, a flow passage through said body, and a closure device carried by said valve body for controlling fluid flow through said passage; providing a manually operated handle; operatively connecting said handle to said closure device, said handle being manually movable between an open and a closed position thereof which also define an open and a closed position of said closure device and hence said valve assembly; and providing manually releasable means for holding said handle in said closed position; said step of providing said manually releasable means comprising providing automatic lock means carried by one of said structure and said handle for engaging the other of said structure and said handle for providing automatic locking of said handle once said handle and said closure device are in said closed position; said step of providing automatic lock means comprising providing spring lock means; the improvement in which said step of providing spring lock means comprises providing said spring lock means in the form of a yieldable spring clip having a substantially U-shaped configuration defined by a bight having a pair of legs diverging therefrom; one of said legs being adapted to be fastened to said structure and the other of said legs having a projection which extends away from both of said legs; and fastening said one leg to said structure so that said projection yieldingly engages said handle to provide said automatic locking of said handle.

* * * * *